Jan. 22, 1935.  G. W. LAWRENCE  1,988,625
METER CONTROLLED LOCK
Filed Oct. 23, 1931  2 Sheets-Sheet 2
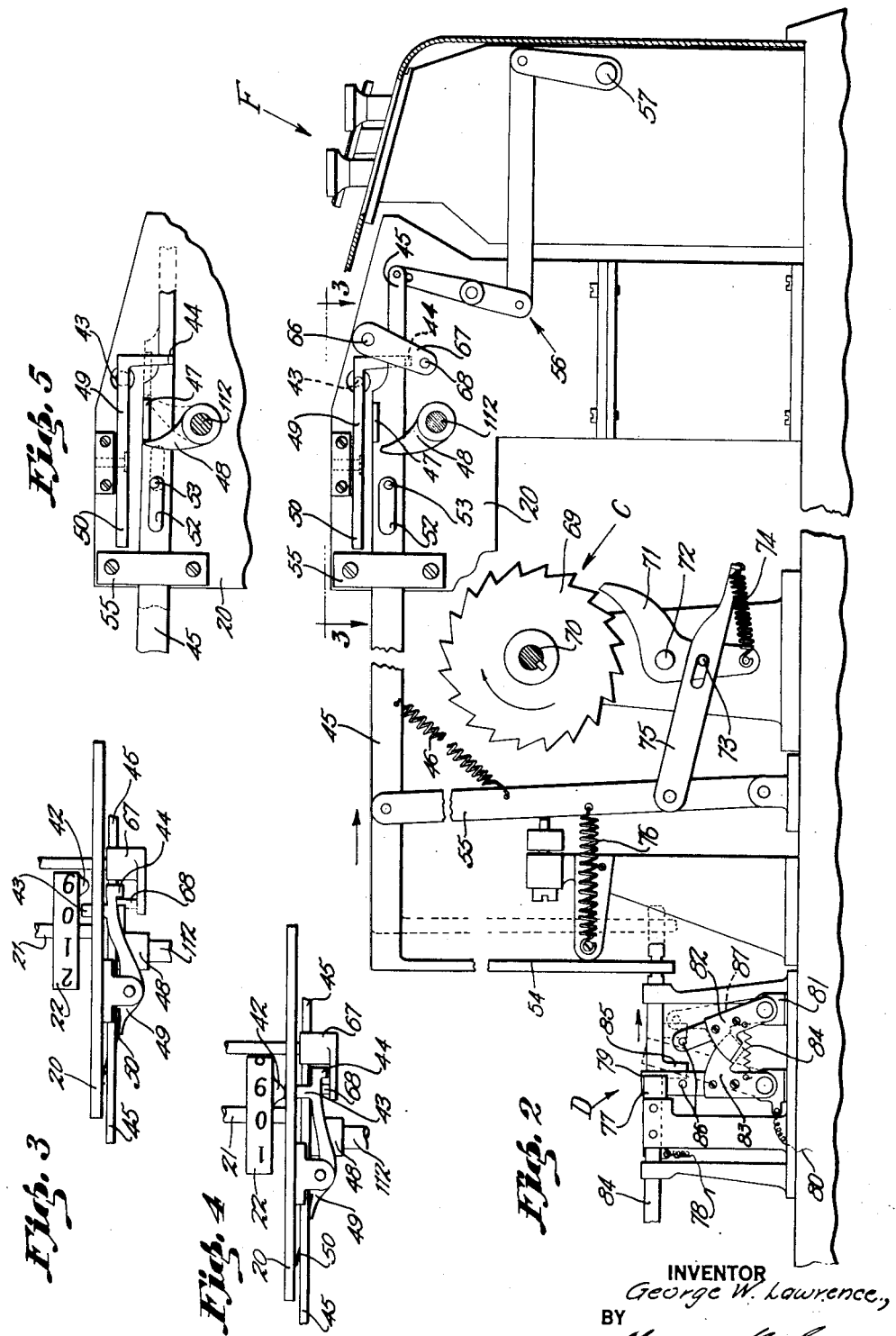
INVENTOR
George W. Lawrence,
BY
Clarence B. Foster
ATTORNEY Patented Jan. 22, 1935

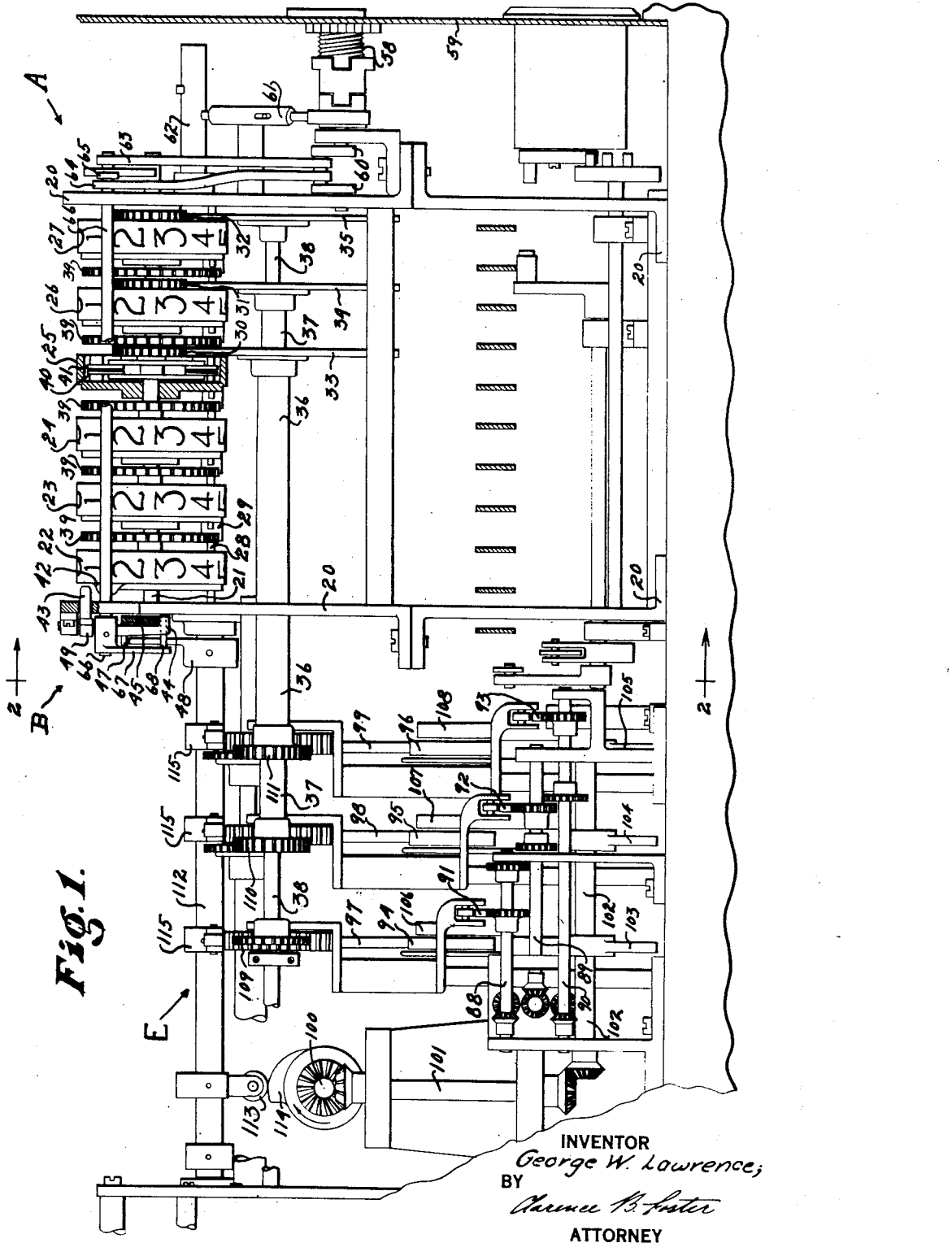

1,988,625

UNITED STATES PATENT OFFICE 1,988,625

METER CONTROLLED LOCK

George W. Lawrence, Los Angeles, Calif., assignor to William J. Pearson, Los Angeles, Calif.

Application October 23, 1931, Serial No. 570,619

2 Claims. (Cl. 235—130)

This invention relates to improvements in meter controlled locks for parcel post machines and the like, such as is disclosed in the copending application No. 367,106, titled Parcel post weighing and stamp printing machine, filed May 29, 1929, by William J. Pearson, designed for weighing parcel post packages and the like, and for printing metered prepaid stamps for the same.

In previously proposed meter mail machines of which I am aware, the meters are so arranged as to lock against further operation only when said meters register zero, thus, in many instances, locking the mechanism before the last operation is completed or compelling the user to have the meter reset while still containing unused prepaid postage, or to lock when operated a pre-determined number of times.

Distinguishing from such machines, it is an important object of the present invention to provide a descending meter which may be preset to indicate an amount of prepaid postage, and which may be operated to subtract postage values from such amount until the total amount of prepaid postage has been exhausted and the meter wheels register zero, the meter being so designed as to permit a final operation in which the meter wheels are turned back past zero to show a complemental figure by which an overdraft may be calculated; to provide an overdraft meter in which the final overdraft operation may be initiated when the meter wheels have been restored to zero or when they indicate an amount of unused postage which is less than the denomination of the stamp to be printed during said final overdraft operation, whereby the actual overdraft may equal the value of the last stamp printed or may equal the difference between such value and said amount of unused postage; and to provide a meter actuating means and an associated locking means for said actuating means controlled by the meter.

Broadly, this meter has associated with it a locking mechanism which functions at the end of the overdraft operation in which the meter wheels are moved back past zero to show various figures depending entirely upon the amount of unused postage remaining in the meter just prior to the overdraft operation and upon the denomination of the stamp printed during such overdraft operation, to lock the meter actuating mechanism against further operation; therefore, it is a further object of the invention to provide an overdraft meter and a locking mechanism associated therewith and so controlled thereby as to function at the end of the overdraft operation, regardless of the final figure indicated by the meter and regardless of the number of preceding operations of the meter.

Another object is to provide a descending postage meter capable of being set to register a given amount of postage and adapted to be operated to subtract different denominational values until said amount is exhausted and to be further operated varying degrees beyond zero to denote an overdraft.

An object of my invention is to provide a meter of such character that it may be set for an amount by the postmaster, that it will provide a visible reading of the balance of that amount remaining in the machine at all times following the deduction of the value of each stamp as printed, and that it will, upon the exhaustion of the set amount, condition a locking mechanism for subsequent actuation to lock the machine against further operation until again set by the postmaster.

Another object of my invention is to provide a locking mechanism of simple character that will lock the machine upon a descending operation of the meter past zero and at the completion of a printing operation, thus allowing the last printed stamp to be abstracted from the machine and used, leave the machine locked against further operation until again reset, while otherwise leaving the machine prepared for the next printing operation.

Another object of my invention is to provide a locking mechanism that will be tripped by the meter when the preset amount of postage has been exhausted and the meter is further descendingly operated past zero, and which will thereafter operate to lock the drive shaft, break the motor circuit and lock the keyboard against further operation until the said meter is again set by the postmaster with an additional amount of postage, whereupon the said locking mechanism will be automatically unlocked and the switch closed, upon the meter being reset.

Another object of my invention is to provide a meter controlled locking mechanism wherein the actuating parts operated by the meter are of simple but durable character, and operate with the minimum of friction, reduce the load upon the meter, and give a positive operation and provide ease of resetting.

Another object of my invention is to provide a locking mechanism wherein the actual locking operation, after the preparatory tripping actuation by the meter, is a power driven, positive locking action, not dependent upon springs or the like.

The within described meter forms the subject of a co-pending application, Serial No. 570,621 filed October 23, 1931.

To the above purposes my invention consists in the novel construction, arrangement and combination of parts as hereinafter fully, clearly and concisely described and definitely pointed out in my claims and illustrated by the accompanying drawings, (2 sheets), in which:

Fig. 1 is a front elevation of a part of a parcel post machine showing the reset meter, the meter actuating mechanism, the re-set mechanism and the meter controlled locking mechanism.

Fig. 2 is a side elevation taken from the left of the figure shown in Fig. 1, at lines 2—2, and discloses the meter controlled locking mechanism, including the lock acting on the main drive shaft and the switch in the motor circuit.

Fig. 3 is a plan view of a portion of the locking mechanism taken at 3—3 in Fig. 2 showing the last meter wheel carrying the lock actuating boss in disengaged position and the engaging pin in position to be engaged.

Fig. 4 is a plan view similar to Fig. 3 showing the same parts in engaged position.

Fig. 5 is a side elevation of a portion of the mechanism shown in Fig. 2, namely the same parts shown in Figs. 3 and 4, and embraces that portion of Fig. 2 as indicated by the lines 3—3, showing in solid lines the engaged position of the lock actuating cam and in broken lines the limit of its movement.

Referring to Fig. 1, the meter controlled lock is shown as actuated by the reset meter A, the lock actuating mechanism is shown at B, and in Fig. 2 the lock for acting against the drive shaft is shown at C, and the motor circuit switch is shown at D.

The reset meter A comprises a frame 20 in which are assembled the various parts; a meter shaft 21 is mounted in the said frame 20 and carries the meter wheels 22, 23, 24, 25, 26 and 27, which together with the pinion shaft 28 and the pinions 29 form a meter wheel train.

Meter wheels 25, 26 and 27 are provided with drive gear wheels 30, 31 and 32, actuated by drive segments 33, 34 and 35, mounted on the series of sleeve shafts 36, 37 and 38, which are operated by the meter set-up and actuating mechanism E.

Each of the meter wheels 22, 23, 24, 25, and 26 is provided with meter pinion carryover gear wheels 39. Each of the meter wheels 25 and 26 is provided with internal double ratchets, 40 and 41, through which motion is transferred from the gears 30, 31 and 32; the right hand meter wheel 27 contains a single ratchet for the drive gear 32; the meter wheels 22, 23 and 24 contain no ratchets.

In reading the reset meter A the left hand numeral wheel 22 would read for thousands of dollars, wheel 23 for hundreds, wheel 24 for tens, wheel 25 for dollars, wheel 26 for tens of cents and wheel 27 for cents, thus the meter represented would have a capacity of $9,999.99. The reset meter operates to count backwards or down, thus when an amount is set in the meter, and by the operations of the machine is exhausted, the turn over of the meter train brings the lock actuating boss 42 into the position illustrated in Fig. 4, which movement causes the contacting pin 43 to move laterally, removing the trip 44 from beneath the drive bar 45 which thereupon drops down under tension of the spring 46 and brings the foot 47 into the path of the cam lever 48, see Fig. 5, which, upon the conclusion of a printing operation of the machine, is operated and moves the drive bar 45 in a lateral direction operating the lock C and the switch D.

Pin 43 and trip 44 are mounted on rocker arm 49 which is tensioned by spring 50 and mounted on the frame 20. Drive bar 45 is slidably supported by bracket 55 secured to the frame 20, is further provided with a slot 52 enabling it to travel in a lateral direction while being supported by pin 53, as best shown in Fig. 5, and is connected at one end with control arm 54 which is connected to the switch D, and further connected to and supported by rocker arm 55 which actuates the drive shaft lock C.

To prevent operation of the keyboard F while the locking mechanism is in locked position there is connected with the drive bar 45 by means of the connecting links 56 through which is is operated a locking means, not shown, mounted on shaft 57 within the keyboard unit F.

The means provided for setting the reset meter A, and for further resetting it when the original setting has been exhausted, comprises a key lock 58 mounted in the casing 59 of the machine connecting to a rotatable crank shaft 60 to which is connected a lock 61 for the reset shaft 62 of the meter, a pinion release member 63, and an element for resetting the drive bar 45 comprising a connecting link 64 mounted at one end on the crank shaft 60 and connected at the other end to a lever 65 mounted on shaft 66 which passes to the opposite side of the meter and has thereto attached a lever 67 with a pin 68 projecting into the path of the drive bar 45 and adapted to lift the foot 47 clear of the cam lever 48 and thus allow the drive bar 45 to resume its original position as shown in Figs. 2 and 5, and upon the rotation of the meter wheel 22 the boss 42 is moved out of contact with pin 43 allowing the setting of the trip 44 during the operation of resetting the reset meter A.

The drive shaft lock C comprises a toothed wheel 69 keyed to the drive shaft 70 of the machine, and is engaged by pawl 71 which is rockably mounted on bearing 72, provided with engaged pin 73, tensioned by spring 74, and actuated by slotted link 75 which is connected to rocker arm 55 and actuated thereby. Link 75 is tensioned by spring 76 and through its connection tensions drive bar 45.

The motor circuit switch D comprises a make and break switch having a stationary contact point 77 with a connecting wire 78, a movable contact point 79 with a connecting wire 80, a controlling lever 81 provided with a cam faced element 82 contacting a similar cam faced element 83 on the movable contact 79, both being tensioned together by spring 84, thus providing a definite quick acting switch. The switch D is a conventional type of quick-throw switch, and will be readily understood without more detailed disclosure.

The actuating element of the switch D is the control rod 85a, which is moved by control arm 54, and is provided with contact trip 85 which in its lateral travel contacts either of pins 86 in contact 79 and lever 81, thus moving first one and then the other of the two cam faces past the point of contact, thus forcing the movable contact 79 in and out of contact with contact 77.

The broken lines 87 in Fig. 2 show the switch in out of contact position.

The meter set-up and actuating mechanism E consists of independently operable elements for positioning relative to a number as originating in the keyboard F, and transmitted by mechanism not shown. The shafts 88, 89 and 90 are selectively and differentially rotated by selector means (not shown) operated by depression of the respective keys on the keyboard; by this means the degree of rotation of each of the shafts 88, 89, 90 is a differential movement corresponding to the movement of a particular key and representing the number or value of that particular key. Thus the shafts 88, 89 and 90 bring into the set-up mechanism E the movement necessary to set-up the numbers set up on the keyboard by punching in or depressing the selected keys, and these shafts by the connecting racks and pinions 91, 92 and 93 actuate the stepped elevators 94, 95 and 96 to move laterally to bring the step of each elevator which corresponds to the number of the particular key depressed under the vertical racks 97, 98 and 99 preparatory to the action of registering. To provide movement for the registering operation there are provided connections from secondary drive shaft 100, comprising the shaft and connecting gears 101 which drive cam shaft 102 having secured to it cams 103, 104 and 105 which operate to successively contact with and raise vertically the respective adjoining elevator carriages 106, 107 and 108, and thus by reason of the contact between the particular step of each stepped elevator selectively set under and in alignment set with the lower ends of the vertical racks the elevation of the elevator carriages, and with them the stepped elevators, will also elevate the vertical racks 97 to rotate the pinions 109, 110 and 111 which are mounted on sleeve shafts 38, 37 and 36 respectively.

Cam lever 48 is secured to cam shaft 112, which shaft is provided with an arm carrying a cam roller 113 actuated by cam 114 secured to and operated by secondary drive shaft 100; shaft 112 is rocked by cam 114 at the completion of a printing operation and further serves to mechanically return the racks 97, 98 and 99 to original position by means of levers 115 bearing upon the upper ends of the racks and depressing them. Thus the locking operation takes place at the completion of a printing operation, allowing the printed stamp to be delivered, and leaving the machine in normal original cycle position.

*Operation*

Assume that the parcel post machine, for which this invention is particularly adapted, is properly assembled and set to operate with the normal relation of parts, the reset meter A having been set with a predetermined monetary value for the postage to be used by the machine in printing stamps.

The cycle of operation of the parcel post machine comprises the movement of the machine included in the printing and metering operation as instituted by the operation of the control key which permits a power clutch to engage and thereby operate the machine by power means, and includes the printing operation of the numeral printer, the actuation of the meters by power means to record the numbers set up in the meter set-up mechanism, the printing operation of the indicia printer, the forwarding of the paper tape, the cutting off of the completed stamp, the resetting or returning, by power means, of the actuated parts of the machine to normal rest position, including the returning of the moving elements of the meter set-up and actuating mechanism. The power driven main shafts in the mechanism disclosed make one rotation to one printing cycle of the machine.

When the operator of the machine has set up within the machine by means of the keyboard the amount of a stamp to be printed, which operation will have moved the elevators 94, 95 and 96 to a point where the mechanical equivalent of the monetary value of said stamp will be represented in the arrangement of the said elevators, the operator actuates the printing mechanism which action rotates the secondary drive shaft 100, and through its connections rotates the cams 103, 104 and 105 which are set to successively raise the elevator carriages 106, 107 and 108 thereby rotating the shafts 36, 37 and 38 which in turn by the recited connections actuate the meter wheels and register therein the amount set up, which in this form of reset meter, is subtracted from the balance still remaining in the meter.

The recited boss 42 on meter wheel 22 is so related to the arranged reading of the meter wheels that at such time as the reading shows on meter wheel 22 and "0" the boss 42 is residing adjacent to the pin 43 as shown in Fig. 3, and in such relation that the rotation of wheel 22 one figure will bring the boss opposite to and in contact with the pin 43, forcing it away from the wheel 22 with a cam-like movement, thus operating the trip 44 of the lock actuating mechanism.

Obviously, in a descending meter of this character, the meter wheels will be descendingly operated until they display a string of zeros and upon movement of the wheel of lowest denomination past zero to nine a transfer or carry-over will be effected to cause the wheels to display a string of nines. This operation will rotate the wheel 22 so that the boss 42 has been rotated the space of one figure, bringing it into the position just described, and operating to release the trip 44 and allow the drive bar 45 to drop so that the drive bar foot 47 will be in the path of the cam lever 48 which will act to move it laterally upon its return movement as actuated by cam 114. Thus any operation of the meter past zero will rotate the train of meter wheels and bring the boss 42 on wheel 22 into contact with the pin 43 and thus trip the locking mechanism.

The lateral movement of drive bar 45 operates to actuate three different elements designed to prevent operation of the machine. The switch D is operated to open the motor circuit, thus causing cessation of power to the machine. The drive shaft lock C is also actuated at the same time, positively preventing rotation of the drive shaft 70, and together with a non-reverse element, not shown, customarily used in this form of machine, prevents rotation of the drive shaft in either direction. The keyboard F is locked by means of a lock, not shown, mounted within the keyboard and operated by shaft 57 as actuated by its connections to the drive bar 45.

To unlock the machine and prepare it for further operation there is provided a mechanism incorporated into the resetting mechanism of the reset meter, and manually operated through the key lock 58, which through the connections 60, 64, 65, 66 and 67 operates pin 68 lifting drive bar 45 allowing trip 44 to move into position under the drive bar 45 by spring action, also allows pin 43 to resume its original position as illustrated in Fig. 3 where it will be in position to be engaged by boss 42 at the next locking operation. The action of operating key lock 58 only lifts drive bar 45, and it then is necessary that the meter be reset to rotate wheel 22 so that the boss 42 is removed from the position shown in Fig. 4 where it is contacting the pin 43 to some other position where pin 43 will be allowed free access to the position shown in Fig. 3. The capacity of a meter to be used for this purpose is not limited to the design shown but may be of any size or monetary capacity required.

The action of the drive bar 45 being raised further operates to allow it to move laterally under spring tension to its original position shown in Fig. 2 when it will automatically close the electric switch D, release the drive shaft lock C by removing the pawl from the path of the toothed wheel, and operate to release the keyboard lock by rocking shaft 57, thus preparing the machine for further normal operations upon the setting of the meter.

This locking mechanism is thus initially tripped by a transfer or carry-over movement of said meter wheel 22 from the zero to the nine position in an overdraft operation, but does not become effective to lock the machine until the end of such overdraft operation; therefore, as such locking mechanism does not restrict the operation of the meter actuating mechanism during the overdraft operation, it will be evident that said actuating mechanism may operate the associated meter wheels to indicate any amount of overdraft within the denominational capacity of a single metering operation and will thereafter become locked at the end of such overdraft operation. Further, it will be evident that, while an overdraft operation may be initiated at the time the prepaid postage is exhausted and the meter wheels are at zero, an overdraft operation may also be initiated at any time before the prepaid postage is exhausted if the denominational value to be registered by such overdraft operation is greater than the amount of unused postage then remaining in the meter.

From the above, it should be apparent that neither the meter, the printer, nor their actuating mechanisms are locked when the meter wheels are at zero or the amount of prepaid postage is exhausted, or when the meter has been operated a fixed number of times or the printer has made a fixed number of impressions; but, on the contrary, the arrangement disclosed provides an overdraft meter controlling a locking mechanism which functions to lock the actuating mechanism at the end of a final overdraft operation in which the descending meter wheels are turned back past zero to show a complemental figure by which an overdraft may be calculated, with the amount of overdraft depending upon the amount of unused prepaid postage left in the meter just prior to the overdraft operation and upon the denomination of the stamp printed during such final overdraft operation.

In connection with "meter mail" machines heretofore proposed, the purchase of prepaid postage has, insofar as I am aware, merely involved payment in advance of the exact amount of postage set up by the post office authorities in the meter.

Since the present machine involves an overdraft meter permitting operation beyond the point at which the amount of prepaid postage set up in the meter is exhausted, and since such overdraft may be any amount from the lowest to the highest denominational value within the capacity of a single operation of the machine, the post office condition for use of this machine will include an additional provision requiring an "overdraft" deposit of an amount equal, at least, to the highest denomination of stamp which the machine is capable of printing.

From the foregoing description, it will be evident that the machine includes a meter capable of being preset to indicate an amount of prepaid postage, and that, as successive stamps are printed, the values thereof are successively deducted from the value remaining in the descending register or meter after the previous operations until, eventually, the entire value of prepaid postage has been used and the several wheels of the descending register or meter all register zero.

At such time, the machine is fully capable of functioning through an additional operative cycle to effect, what is herein termed, an "overdraft" operation, in which the descending meter wheels are turned back past zero to show a complemental figure by which an overdraft may be calculated by the postal authorities. For example, with said meter wheels thus restored to zero and the mechanism conditioned to print and register a stamp of 21 cents denomination, the overdraft operation will cause the first actuating sector to rotate the cents meter wheel one space from 0 to 9 and thus effect a transfer or carry-over, causing all of the other meter wheels to rotate one space, the meter now reading 9,-999.99 and the boss 42 on the wheel 22 having engaged the pin 43 to trip the locking mechanism. As previously explained, this does not translate the drive bar 45 to lock the shaft 70, but merely conditions this locking mechanism so that it may function at the completion of the overdraft cycle. Continuing the overdraft operation, the dimes meter wheel will be rotated two spaces by its actuating sector, the meter wheels now reading 9,999.79, which is a complemental figure by which the amount of overdraft can be calculated by the postal authorities. This completes this overdraft operation, the last step of which will rock the shaft 112 to translate the bar 45 and thus render the locking mechanism effective, the control arm 54 of said bar at the same time opening the switch D to break the motor circuit.

In this manner, the machine is stopped and the shaft 70 is locked at the end of such an overdraft operation.

An overdraft operation may also take place before the postage is exhausted and before the meter wheels are restored to zero in instances in which the amount of unused postage remaining in the meter is less than the denomination of stamp to be printed by the overdraft operation. For example, with the meter wheels showing $0,000.21 of unused postage, the printing of a 57 cent stamp will cause the meter wheels to successively show 0,000.20—0,000.19—0,000.18 etc. until the prepaid postage is exhausted and the meter wheels show 0,000.00. Continuing the operation, said wheels next show 9,999.99 at which time the boss 42 of the wheel 22 will engage the pin 43 of the trip 44 to condition the locking mechanism for subsequent operation. In the completion of this overdraft operation the meter wheels successively show 9,999.98—9,999.-97—9,999.96 etc. until they finally show 9,999.64 which is the complemental overdraft figure. At the end of the operation the previously tripped locking mechanism is operated to lock the shaft 70 and open the switch D, as previously explained.

After a final overdraft operation and before the machine can again be used, it is necessary that an authorized post office official calculate the amount of overdraft, reset the meter wheels to indicate the amount of purchased postage, and release the drive shaft by normalizing the locking mechanism.

In calculating the amount of overdraft, the complemental figure showing on the meter wheels will be subtracted from a figure which is equal to the maximum capacity of the meter plus one, which figure will be 10,000.00 for the meter herein disclosed.

For instance, in the first example above explained, the complemental figure 9,999.79 will be subtracted from 10,000.00 to leave 0.000.21, which designates an overdraft of 21 cents. In the second example above explained, the complemental figure 9,999.64 will be substracted from 10,000.00 to leave 0,000.36, which designates an overdraft of 36 cents. Thus, in the first example, the overdraft is equal to the denomination of the 21 cent stamp last printed, while in the second example 21 cents of the value of the 57 cent stamp last printed was paid for by the unused balance of postage then remaining in the meter, leaving 36 cents of said value to be carried over into the "overdraft" figure.

It will thus be apparent that such overdrafts will vary from time to time and will depend entirely upon the amount of unused postage remaining in the meter just prior to the overdraft operation and upon the denomination of the stamp printed during this final overdraft operation.

With the overdraft thus calculated, the user pays a desired amount for the purchase of additional postage; and, after deducting from the amount of such payment the amount of the calculated overdraft, the post office official will, in the manner above explained, set the meter wheels to indicate the residual amount, which then defines the amount of prepaid postage which may be metered out of the preset meter before a subsequent resetting becomes necessary. Said official will then normalize the locking mechanism and close the switch D, after which the machine is in condition for further use, the "overdraft" deposit remaining with the postal authorities to cover a subsequent overdraft.

The structure of the locking mechanism itself, and the means for controlling and actuating the movements thereof, together with the other objects set forth, may be varied in form without departure from my invention as hereinafter claimed. The showing of this description and drawing being merely an illustration of one embodiment of my invention in response to the statutory requirement to applications for patents.

While the form of mechanism here shown and described, is admirably adapted to fulfil the objects primarily stated, it is to be understood that it is not intended to confine the invention to the one form of embodiment herein disclosed, for it is susceptible of embodiment in various forms, all coming within the scope of the claims which follow.

I claim:

1. In a machine of the character described, a descending meter, drive means for the machine, a lock for said drive means, lock-operating means, a trip normally restraining said lock-operating means, trip-releasing means carried by said meter for releasing and setting said lock-operating means when the highest-order wheel of said meter descends past zero, and means to actuate said lock-operating means by said drive means at the end of the cycle of operation of said meter during which said meter descended past zero.

2. In a device of the character described, a driving means, a descending meter, a lock for said driving means, a trip, a driven element operated by said driving means, a slidable member adjacent said trip and said driven member and adapted to operate said lock, said trip normally engaging and positioning said slidable member out of the path of said driven element, means on said meter to engage said trip for releasing and setting said slidable member in the path of said driven element when the highest-order wheel of said meter descends past zero, said driven element being adapted to engage and move said slidable member to lock-operating position at the end of the cycle of operation of said meter during which said meter descends past zero.

GEORGE W. LAWRENCE.